(12) United States Patent
Park et al.

(10) Patent No.: US 8,218,619 B2
(45) Date of Patent: Jul. 10, 2012

(54) TRANSCODING APPARATUS AND METHOD BETWEEN TWO CODECS EACH INCLUDING A DEBLOCKING FILTER

(75) Inventors: Gwang Hoon Park, Gyeonggi-do (KR); Min Woo Park, Gyeonggi-do (KR); Seong Seon Baek, Gyeonggi-do (KR); Doug Young Suh, Gyeonggi-do (KR); Kyu Heon Kim, Seoul (KR)

(73) Assignee: University-Industry Cooperation Group of Kyung Hee University, Yongin-si, Gyeonggi-do (KR)

( * ) Notice: Subject to any disclaimer, the term of this patent is extended or adjusted under 35 U.S.C. 154(b) by 914 days.

(21) Appl. No.: 12/260,119

(22) Filed: Oct. 29, 2008

(65) Prior Publication Data

US 2009/0116546 A1 May 7, 2009

(30) Foreign Application Priority Data

Nov. 1, 2007 (KR) ........................ 10-2007-0110885

(51) Int. Cl.
*H04B 1/66* (2006.01)
(52) U.S. Cl. ................................. 375/240.01
(58) Field of Classification Search ............. 375/240.01; 704/504
See application file for complete search history.

(56) References Cited

U.S. PATENT DOCUMENTS

2006/0268985 A1* 11/2006 Liang et al. .............. 375/240.16
2009/0097560 A1* 4/2009 Robertson ................ 375/240.16
2009/0279612 A1* 11/2009 Pandit et al. ............. 375/240.25

OTHER PUBLICATIONS

Liang et al., "MPEG-4 to H.264/AVC Transcoding", Aug. 12-16, 2007, ACM, pp. 689-693.*
Nguyen et al., "Efficient Video Transcoding from H.263 to H.264/AVC Standard with Enhanced Rate Control", Feb. 18, 2006, Hindawi Publishing Corporation EURASIP Journal on Applied Signal Processing, vol. 2006, pp. 1-15.*

\* cited by examiner

*Primary Examiner* — Matthew Smithers
(74) *Attorney, Agent, or Firm* — Occhiuti Rohlicek & Tsao LLP

(57) ABSTRACT

Disclosed are a transcoding apparatus and method between two codecs each including a deblocking filter. The transcoding method between first and second codecs each including a deblocking filter, may include decoding input data encoded according to the first codec, according to the first codec so as to generate decoded data; and encoding the decoded data according to the second codec. The decoded data may include data on which deblocking filtering is not performed by the first codec, or data on which deblocking filtering is adaptively performed by the first codec. The decoded data may further include data on which deblocking filtering is performed by the first codec. The decoded data may be used as input data when the second codec performs encoding and/or when the second codec performs motion estimation.

18 Claims, 11 Drawing Sheets

TRANSCODING APPARATUS AND METHOD BETWEEN TWO CODECS EACH INCLUDING A DEBLOCKING FILTER

CROSS-REFERENCE TO RELATED PATENT APPLICATION

This application claims the benefit of Korean Patent Application No. 10-2007-0110885, filed on Nov. 1, 2007, in the Korean Intellectual Property Office, the disclosure of which is incorporated herein in its entirety by reference.

BACKGROUND OF THE INVENTION

1. Field of the Invention

The present invention relates to a transcoding method, and more particularly, to a transcoding apparatus and method between two codecs each including a deblocking filter.

2. Description of the Related Art

'Video transcoding' is converting data compressed according to a certain video codec into compression data of another video codec or into a different type of compression data of the same video codec. Video transcoding is required when a user device such as a terminal device supports only a certain video codec, when an amount or speed of data to be transmitted has to be controlled according to, for example, a condition of a network, or when users request various services such as a high-quality video content service or a high speed service.

An example of video transcoding between different types of video codes is converting data between a Moving Picture Experts Group-4 (MPEG-4) codec and an H.264/Advanced Video Coding (AVC) codec. An example of video transcoding between the same types of video codes is converting a profile in an H.264/AVC codec. For example, a baseline profile is converted into an upper profile, or vice versa. Another example of video transcoding between the same types of video codes is controlling data capacity or video quality from a service provider. For example, data encoded according to a baseline profile of an H.264/AVC is converted into data of the same baseline profile by reducing capacity of the data.

The most basic method from among a plurality of transcoding methods is decoding data encoded according to a certain codec, and then encoding the decoded data according to a desired codec. In this case, a transcoding apparatus can be formed by sequentially connecting a decoder corresponding to the encoded data and an encoder corresponding to the desired codec.

FIG. 1 is a diagram for describing a transcoding apparatus and method from an MPEG-4 codec (MPEG-4 part 2 visual codec) to an H.264/AVC codec. In FIG. 1, a decoding unit A of a transcoder corresponds to a decoder of the MPEG-4 codec and an encoding unit B of the transcoder corresponds to an encoder of the H.264/AVC codec.

Referring to FIG. 1, a bitstream of data encoded according to the MPEG-4 codec is input to the decoding unit A of the transcoder, which corresponds to the decoder of the MPEG-4 codec. If the input bitstream is an intra block, the decoding unit A sequentially performs entropy decoding, inverse quantization, and inverse transformation so as to generate a decoded image. If the input bitstream is an inter block, the decoding unit A adds a prediction image generated by further performing motion compensation to a residual data generated by further performing inverse transformation, so as to generate the decoded image. Then, the decoded image is stored in a reference image buffer for next prediction and also is temporarily stored in an image buffer before being input to the encoding unit B of the transcoder.

Then, the decoded image stored in the image buffer is input to the encoding unit B of the transcoder, which corresponds to the encoder of the H.264/AVC codec. The encoding unit B initially generates a prediction image. If input data corresponds to an intra block, the encoding unit B generates the prediction image by performing intra prediction. On the other hand, if the input data corresponds to an inter block, the encoding unit B generates the prediction image by generating a motion vector through motion estimation from a reference image stored in the reference image buffer, and performing motion compensation based on the motion vector. The prediction image is subtracted from the input image so as to obtain a residual data, and output data corresponding to the H.264/AVC codec (H.264/AVC bitstream) is generated by performing transformation, quantization, and entropy coding on the residual data. Also, a reconstructed residual image is generated by performing inverse quantization and inverse transformation after quantization is performed, deblocking filtering is performed on an image generated by adding the reconstructed residual image to the prediction image through a deblocking filter, and an image generated by performing deblocking filtering is stored in the reference image buffer for next reference.

The transcoding method illustrated in FIG. 1 includes both a decoding process and an encoding process. Thus, a transcoding process is complicated and a transcoding speed is slower than other transcoding methods. However, in the transcoding method illustrated in FIG. 1, data loss during the transcoding process is minimized and thus the performance is excellent. In particular, if information such as motion information or block type information of original data before being transcoded is used when the data is encoded, complexity of transcoding can be reduced and speed can be improved.

SUMMARY OF THE INVENTION

Currently, many video codecs include a deblocking filtering process in encoding and decoding loops in order to remove a blocking effect of a reconstructed image and thus to improve coding efficiency. A representative example of a codec including a deblocking filter is an H.264/AVC codec. Also, video codecs such as a scalable video coding (SVC) codec and a multiview video coding (MVC) codec which are standardized based on the H.264/AVC codec include the deblocking filter. Furthermore, a VC-1 codec of the Society of Motion Picture and Television Engineers (SMPTE) or an Audio Video Standard (AVS) codec according to a Chinese standard includes the deblocking filter.

However, between these codecs including the deblocking filter, if transcoding is performed by decoding data and then encoding the decoded data as in the above-described conventional transcoding method, unexpected problems can occur. In more detail, according to the conventional transcoding method, initially, an input image stream is decoded and deblocking filtering is performed during a decoding process. An image generated as a result of the decoding process is a decoded image on which the deblocking filtering is performed. Then, the decoded image is encoded so as to complete a transcoding process. However, since the encoding loop includes the deblocking filter, deblocking filtering is performed once again before a transcoded image is ultimately generated.

As a result, deblocking filtering is performed twice on the transcoded image and thus quality deterioration such as blurring can occur to a reconstruction image generated by decoding the transcoded image. Also, since the reconstruction image is used as a reference image when another image is decoded, the quality deterioration can be propagated to other images. Thus, if transcoding is performed between codecs each including a deblocking filter by using the conventional transcoding method, quality deterioration such as blurring can occur and transcoding efficiency can be greatly reduced.

The present invention provides a transcoding apparatus and method capable of preventing quality deterioration such as blurring when transcoding is performed between image codes, particularly, video codecs each including a deblocking filter.

The present invention also provides a transcoding apparatus and method capable of preventing a deblocking filtering process from being unnecessarily repeatedly performed between image codes, particularly, video codecs each including a deblocking filter.

The present invention also provides a transcoding apparatus and method capable of improving both transcoding performance and efficiency by adaptively performing a deblocking filtering process between image codes, particularly, video codecs each including a deblocking filter.

According to an aspect of the present invention, there is provided a transcoding method between first and second codecs each including a deblocking filter, the transcoding method including decoding input data encoded according to the first codec, according to the first codec so as to generate decoded data; and encoding the decoded data according to the second codec, wherein the decoded data includes first data on which deblocking filtering is not performed by the first codec.

According to another aspect of the present invention, there is provided a transcoding method between first and second codecs each including a deblocking filter, the transcoding method including decoding input data encoded according to the first codec, according to the first codec so as to generate decoded data; and encoding the decoded data according to the second codec, wherein the decoded data includes first data on which deblocking filtering is adaptively performed by the first codec.

According to another aspect of the present invention, there is provided a transcoding apparatus between first and second codecs each including a deblocking filter, the transcoding apparatus including a decoding unit for decoding input data encoded according to the first codec, according to the first codec; a first image buffer for storing first decoded data which is output from the decoding unit and is not passed through a deblocking filter of the decoding unit; and an encoding unit for encoding the first decoded data input from the first image buffer, according to the second codec.

According to another aspect of the present invention, there is provided a transcoding apparatus between first and second codecs each including a deblocking filter, the transcoding apparatus including a decoding unit for decoding input data encoded according to the first codec, according to the first codec; an adaptive deblocking filter for performing adaptive deblocking filtering on first decoded data which is not passed through a first deblocking filter of the decoding unit; a first image buffer for storing second decoded data which is output from the adaptive deblocking filter; and an encoding unit for encoding the second decoded data input from the first image buffer, according to the second codec.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Before describing embodiments of the present invention, a problem that can occur when transcoding is performed between two codecs each including a deblocking filter by using a conventional transcoding method will be described in detail. Hereinafter, video codecs will be described as an example of codecs. However, embodiments of the present invention may also be applied to still image codecs as long as each of codecs used before and after conversion includes a deblocking filter.

Figure 1:
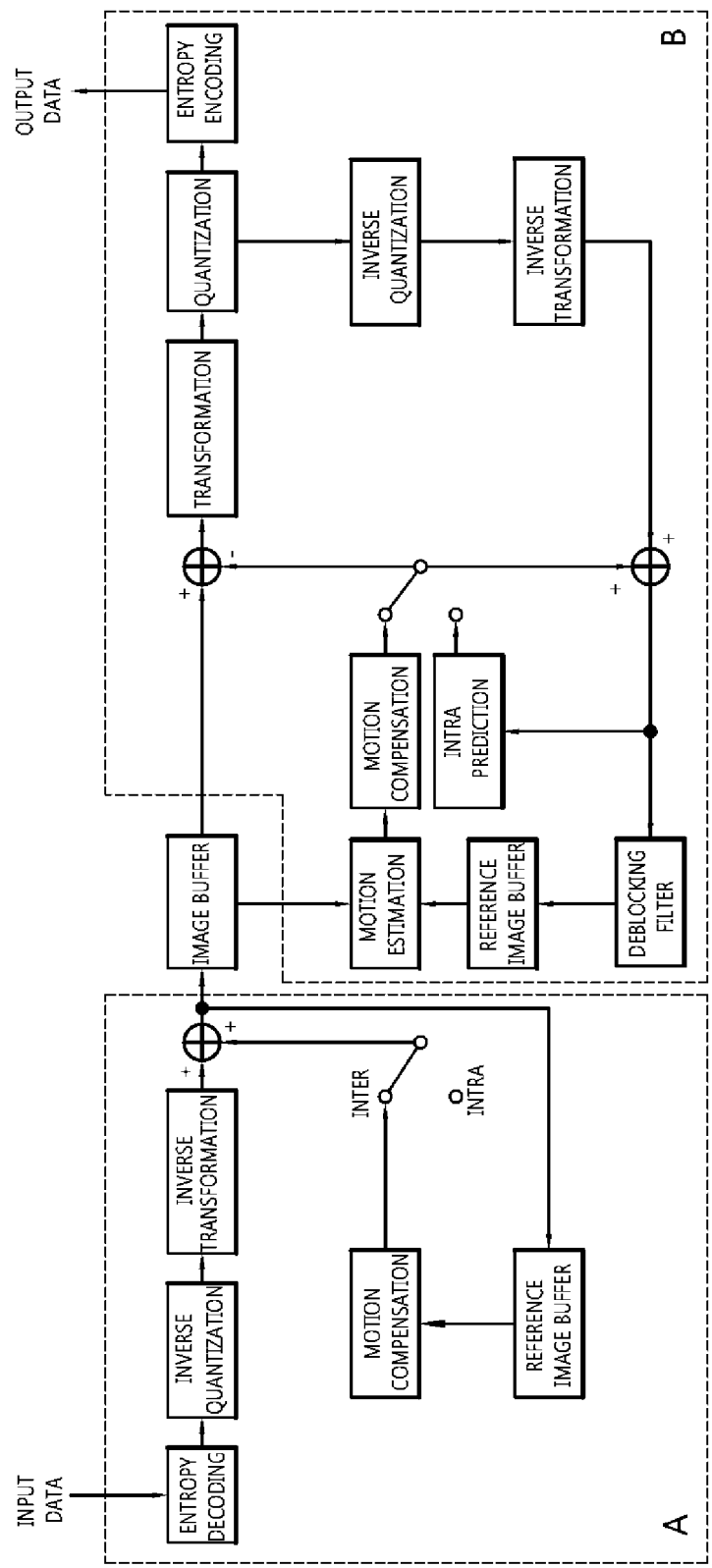
FIG. 1 is a diagram for describing a transcoding apparatus and method from a Moving Picture Experts Group-4 (MPEG-4) part 2 visual codec to an H.264/Advanced Video Coding (AVC) codec.
Figure 2:
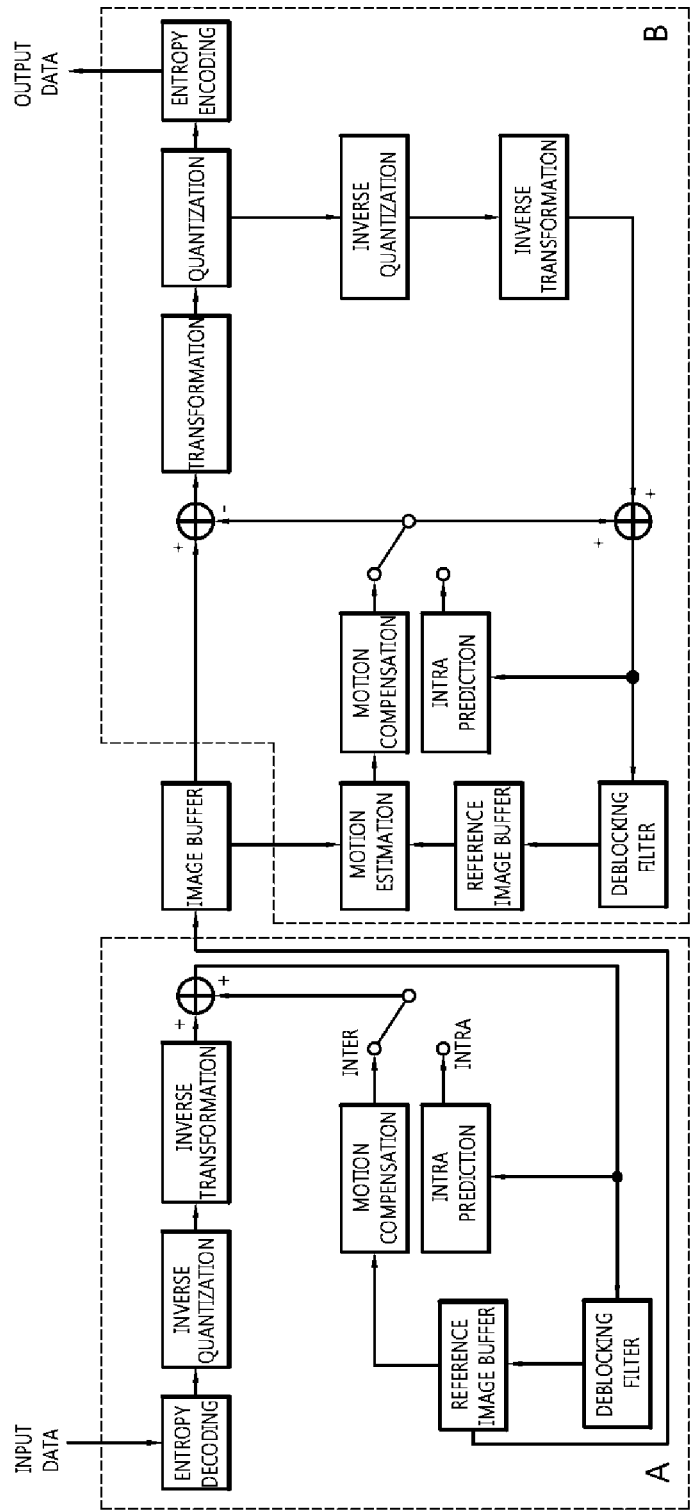
FIG. 2 is a diagram for describing a transcoding apparatus and method from a certain H.264/AVC-based codec to a different H.264/AVC-based codec.

FIG. 2 is a diagram for describing a transcoding apparatus and method between two codecs each including a deblocking filter. In FIG. 2, the transcoding apparatus is formed by simply combining a decoding unit and an encoding unit of conventional codecs, and transcoding is performed from a certain H.264/Advanced Video Coding (AVC)-based codec to a different H.264/AVC-based codec. Here, a H.264/AVC-based codec includes an H.264/AVC codec, and a scalable video coding (SVC) codec and a multiview video coding (MVC) codec based on the H.264/AVC codec.

Referring to FIG. 2, a decoding unit A of a transcoder includes a deblocking filter and an encoding unit B of the transcoder also includes a deblocking filter. In the transcoder illustrated in FIG. 2, a decoded image on which deblocking filtering is performed is stored in a reference image buffer and also is temporarily stored in an image buffer before being input to the encoding unit B of the transcoder. Then, the decoded image stored in the image buffer is encoded and inverse transformed so as to be input to the deblocking filter.

Thus, deblocking filtering is performed again. An image on which deblocking filtering is performed is stored in a reference image buffer of the encoding unit B.

Eventually, in the transcoder illustrated in FIG. 2, since each of the decoding unit A and the encoding unit B performs deblocking filtering once on the image stored in the reference image buffer of the encoding unit B, a possibility that blurring occurs to block boundaries is very high. Also, since the image on which deblocking filtering is performed twice is continuously used as a reference image when subsequent images are encoded, quality deterioration is propagated to the subsequent images.

Hereinafter, a transcoding apparatus and method capable of preventing quality deterioration caused by repeatedly performing deblocking filtering will be described in detail by explaining embodiments of the present invention with reference to the attached drawings.

First Embodiment

In the first embodiment of the present invention, in order to prevent quality deterioration caused by repeatedly performing deblocking filtering when transcoding is performed between two codecs each including a deblocking filter, image data on which deblocking filtering is not performed by a decoding unit of a transcoding apparatus is extracted and stored in an image buffer, and an encoding unit of the transcoding apparatus receives the image data on which deblocking filtering is not performed as input data from the image buffer so as to perform an encoding process.

Figure 3:
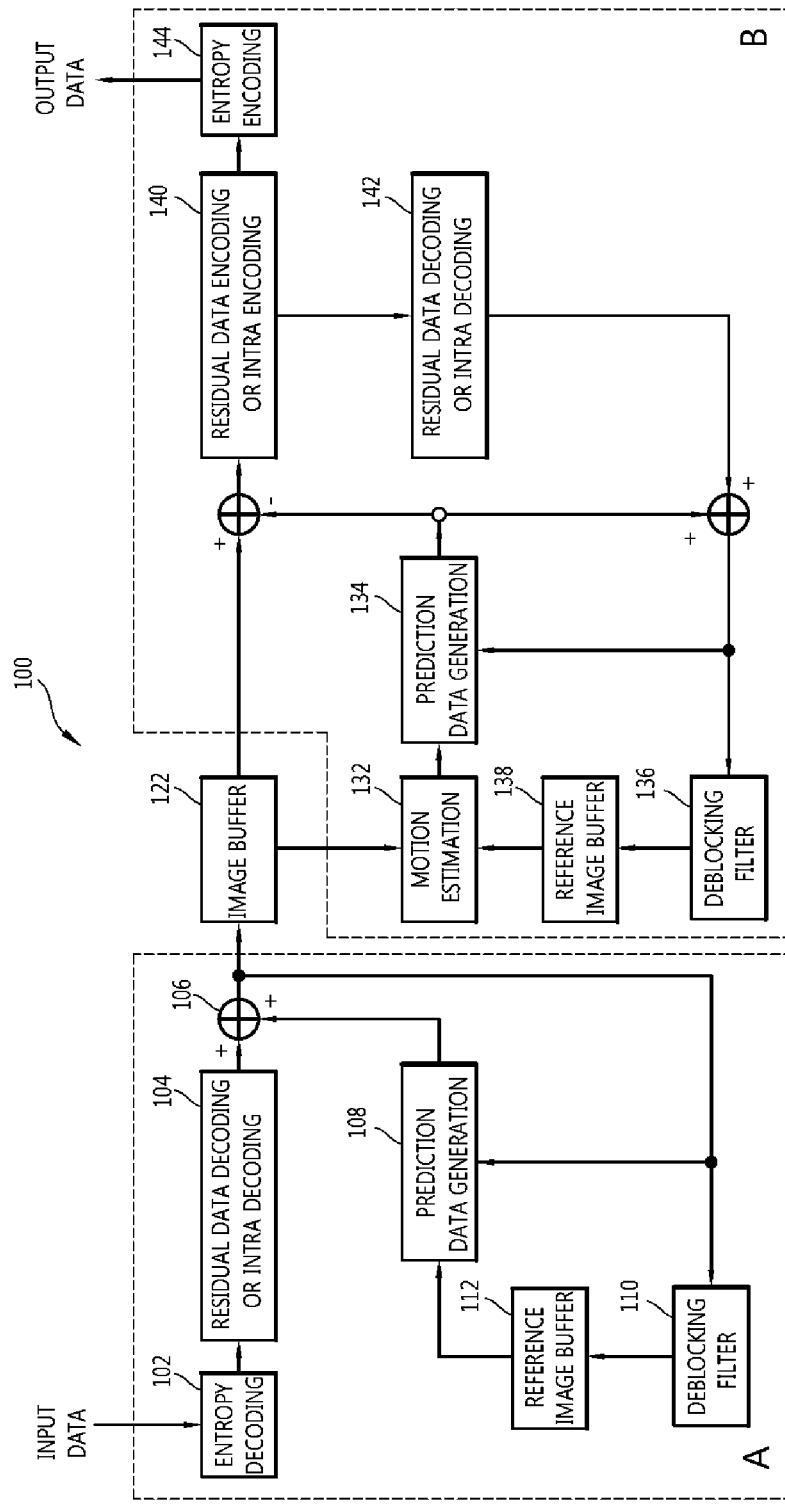
FIG. 3 is a diagram for describing a transcoding apparatus and method according to a first embodiment of the present invention.

FIG. 3 is a diagram for describing a transcoding apparatus and method between two codecs each including a deblocking filter, according to the first embodiment of the present invention. In FIG. 3, a decoding unit A and an encoding unit B respectively correspond to first and second video codecs for describing the transcoding apparatus and method according to the first embodiment of the present invention. Each of the decoding unit A and the encoding unit B includes a deblocking filter.

According to the present invention (including the first through fourth embodiments), any codec may be used as one of the first and second video codecs as long as the code includes a deblocking filter. For example, the first and second video codecs may be the same types of codecs or different types of codecs. The transcoding apparatus and method according to the first embodiment of the present invention may perform transcoding between the same types of codecs (H.264/AVC H.264/AVC, H.264/AVC SVC, H.264/AVC MVC, SVC H.264/AVC, SVC MVC, MVC H.264, MVC SVC, VC-1 VC-1, AVS AVS, etc.), or between different types of codecs (H.264/AVC VC-1, H.264/AVC AVS, VC-1 H.264/AVC).

Referring to FIG. 3, input data encoded according to the first video codec is input to an entropy decoding portion 102 of the decoding unit A so as to perform entropy decoding according to the first video codec. Then, image data output from the entropy decoding portion 102 is input to a residual data decoding or intra decoding portion 104 so as to perform only residual data decoding, or both residual data decoding and intra decoding, according to the first video codec. For example, if the first video codec is an H.264/AVC-based codec, prediction is performed on both inter and intra blocks and thus the residual data decoding or intra decoding portion 104 performs only residual data decoding. On the other hand, if the first video codec is a VC-1-based codec, prediction coding is not performed on intra blocks and is performed on only inter blocks and thus the residual data decoding or intra decoding portion 104 performs residual data decoding or intra decoding.

A prediction data generation portion 108 generates prediction data of a current block. According to the first video codec, if the current block is an inter block, the prediction data may be generated by performing motion compensation using a reference image stored in a reference image buffer 112. If the current block is an intra block, the prediction data may be generated by performing intra prediction using an image in the same frame. However, according to the type of the first video codec, the prediction data may not be generated if the current block is an intra block.

Then, the prediction data generated by the prediction data generation portion 108 and image data output from the residual data decoding or intra decoding portion 104 are input to an adder 106, and a decoded image is output from the adder 106. According to the first embodiment of the present invention, the decoded image output from the adder 106 is directly stored in an image buffer 122 without passing through a deblocking filter 110. Then, the decoded image (inter image) output from the adder 106 is stored in the reference image buffer 112 so as to be used when a subsequent frame is decoded. In this case, as in a conventional transcoding method, image data passed through the deblocking filter 110 is stored.

The image buffer 122 temporarily stores image data to be input to the encoding unit B. That is, the encoding unit B receives the image data stored in the image buffer 122 as input data so as to perform an encoding process. In more detail, a motion estimation portion 132 may generate a motion vector by using a reference image stored in a reference image buffer 138 and an image input from the image buffer 122, according to the second video codec. Then, according to the second video codec, if the current block is an inter block, a prediction data generation portion 134 generates prediction data from the reference image of the reference image buffer 138 by performing motion compensation using the motion vector generated by the motion estimation portion 132. If the current block is an intra block, the prediction data generation portion 134 may or may not generate the prediction data by performing intra prediction using an image in the same frame.

According to the second video codec, if the current block is an inter block, a residual data encoding or intra encoding portion 140 may encode residual data that is difference data between a prediction image generated by the prediction data generation portion 134 and a current image stored in the image buffer 122. If the current block is an intra block, the residual data encoding or intra encoding portion 140 may encode residual data that is difference data between an intra prediction image generated by the prediction data generation portion 134 and the current image stored in the image buffer 122, or may perform intra encoding on the current image instead of the difference data between the intra prediction image and the current image. Intra prediction may be performed by using a neighboring block of the current block. Then, an entropy encoding portion 144 performs entropy encoding according to the second video codec. Also, a residual data decoding or intra decoding portion 142 decodes image data encoded by the residual data encoding or intra encoding portion 140. The image data output from the residual data encoding or intra encoding portion 140 is added to the prediction image output from the prediction data generation portion 134 so as to be input to a deblocking filter 136. Image data on which deblocking filtering is performed by the deblocking filter 136 is stored in the reference image buffer 138 for next prediction.

Figure 4:
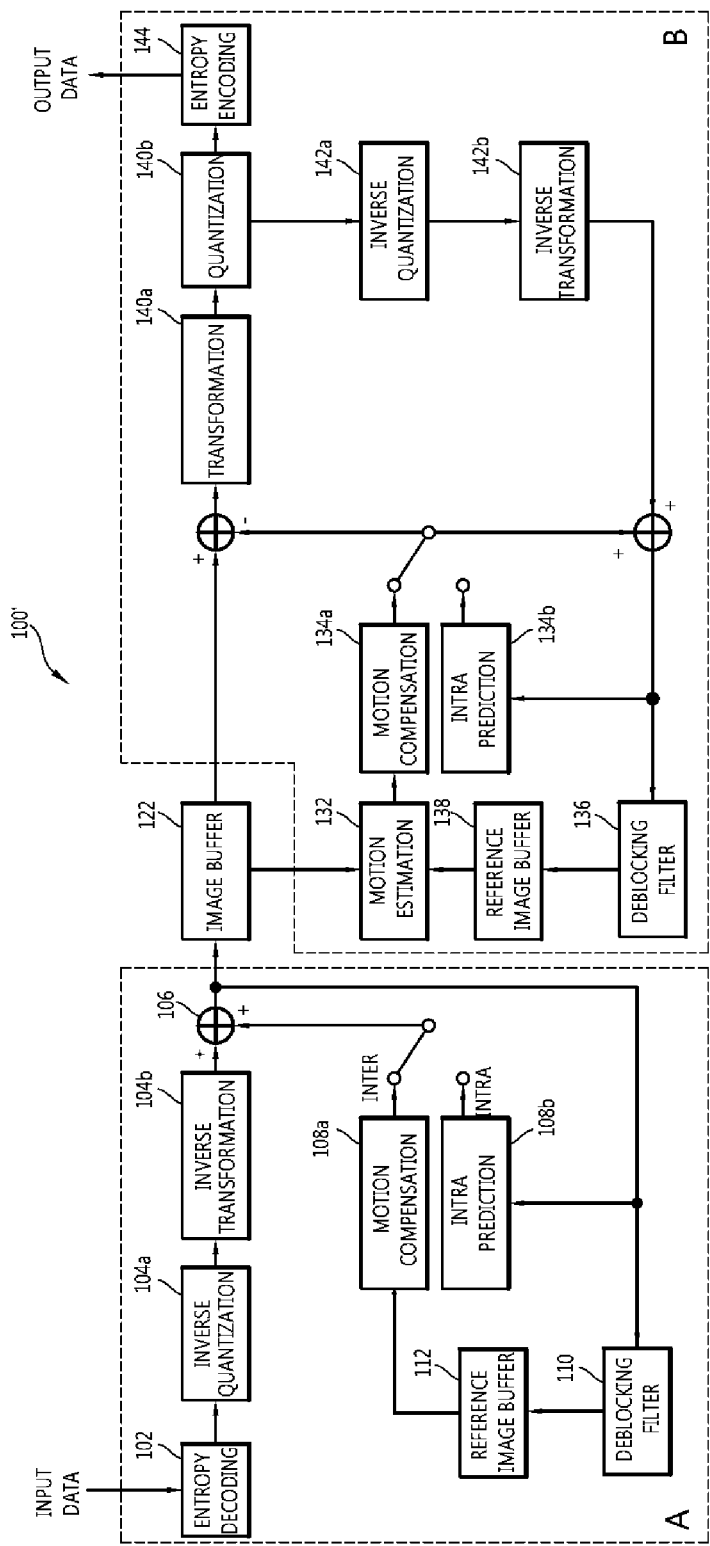
FIG. 4 is a diagram showing a case when transcoding is performed from a certain H.264/AVC-based codec to a different H.264/AVC-based codec, as a practical example of FIG. 3.

FIG. 4 is a diagram showing a case when a first video codec is a certain H.264/AVC-based codec and a second video codec is a different H.264/AVC-based codec, as a practical example of FIG. 3. For example, the first video codec (decoding unit A) may be a decoding unit according to a baseline profile of an H.264/AVC codec and the second video codec (encoding unit B) may be an encoding unit for supporting temporal scalability in a baseline profile of an SVC codec that is extended from the H.264/AVC codec. FIG. 4 will now be briefly described in conjunction with FIG. 3 based on differences from the descriptions of FIG. 3.

Referring to FIG. 4, according to video encoding/decoding processes of the H.264/AVC codec, the residual data decoding or intra decoding portion 104 and the residual data encoding or intra encoding portion 140 illustrated in FIG. 3 are respectively divided into an inverse quantization portion 104a and an inverse transformation portion 104b, and a transformation portion 140a and a quantization portion 140b. Also, the prediction data generation portion 108 illustrated in FIG. 3 is divided into a motion compensation portion 108a and an intra prediction portion 108b.

Referring to FIG. 4, according to the first embodiment of the present invention, image data output through the entropy decoding portion 102, the inverse quantization portion 104a, and the inverse transformation portion 104b is added to a prediction image output through the motion compensation portion 108a or the intra prediction portion 108b so as to be output as a decoded image. Then, the decoded image is directly stored in the image buffer 122 without passing through the deblocking filter 110, so as to be used as input data of the encoding unit B. And, decoded image data output from adding operation of the predicted image data and the residual data pass through the deblocking filter 110 so as to be stored in the reference image buffer 112 for the use of the next reference.

The present applicant performed a simple experiment in order to verify the performance of the transcoding method according to the first embodiment of the present invention. In the experiment, a bitstream generated by encoding a Foreman CIF 30 Hz image by using a baseline profile of an H.264/AVC codec was used as input data. A decoder according a baseline profile of an existing H.264/AVC codec was used as a decoding unit A of the transcoding apparatus, and an encoder according the baseline profile of the existing H.264/AVC codec was used as an encoding unit B of the transcoding apparatus. In a comparative example of the present invention, image data on which deblocking filtering was performed by the decoding unit A was stored in an image buffer 122 between the decoding unit A and the encoding unit B (refer to FIG. 2). On the other hand, in the transcoding method according to the first embodiment of the present invention, image data on which deblocking filtering was not performed by the decoding unit A was stored in the image buffer 122 between the decoding unit A and the encoding unit B (refer to FIG. 4).

Figure 5:
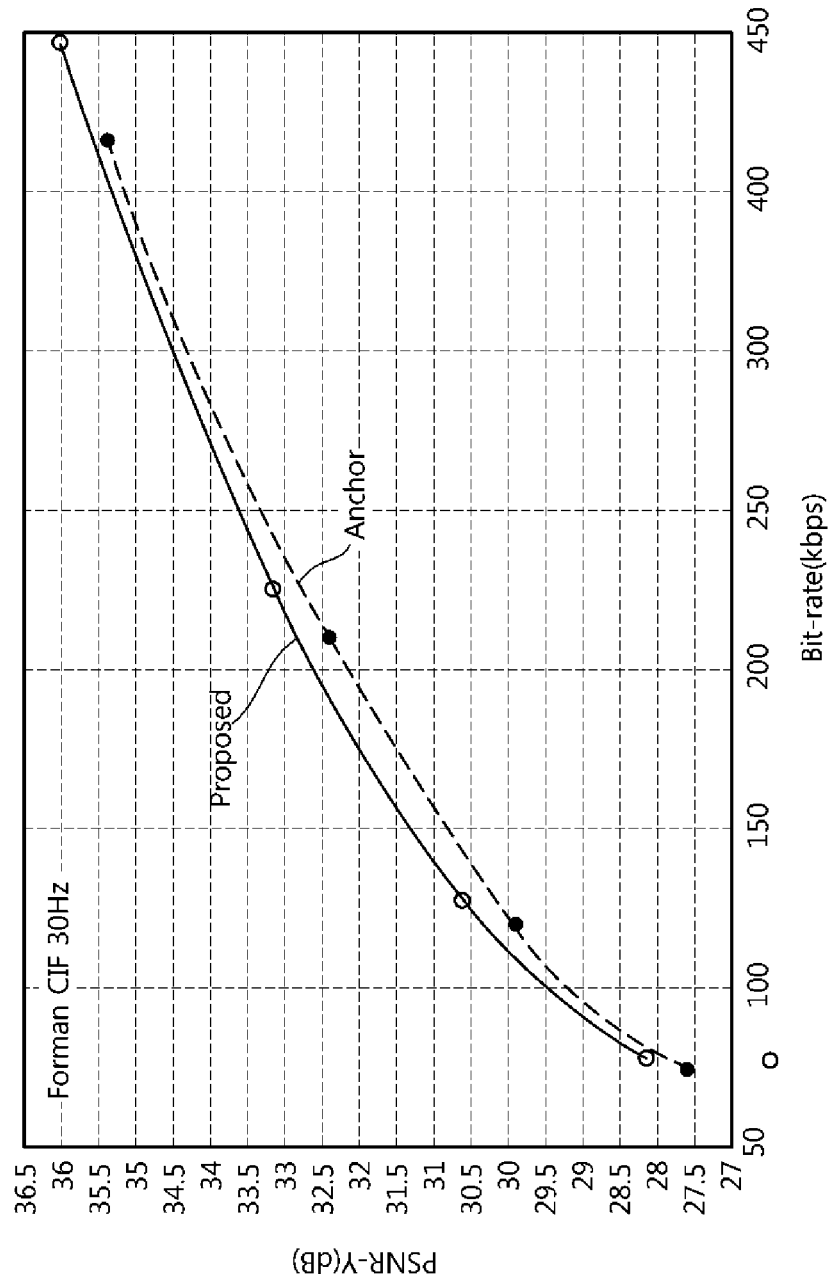
FIG. 5 is a graph showing experimental results of a conventional transcoding method and the transcoding method according to the first embodiment of the present invention.

FIG. 5 is a graph showing experimental results of a conventional transcoding method and the transcoding method according to the first embodiment of the present invention. FIG. 5 shows peak signal to noise ratios (PSNRs) with regard to bit rates which are calculated after encoded data output through each transcoding method is decoded.

Referring to FIG. 5, in comparison to the conventional transcoding method (indicated as 'Anchor' in FIG. 5), the PSNRs are improved by about 0.28 decibel (dB) in average and the bit rates are reduced by 5.6% in average in the transcoding method according to the first embodiment of the present invention (indicated as 'Proposed' in FIG. 5). Thus, it is verified that transcoding performance of the first embodiment of the present invention is superior to the transcoding performance of the conventional transcoding method.

Second Embodiment

In the second embodiment of the present invention, two image buffers are used, and an encoding unit of a transcoding apparatus uses two types of image data such as image data on which deblocking filtering is performed and image data on which deblocking filtering is not performed, as input data. In more detail, image data on which deblocking filtering is not performed by a decoding unit of the transcoding apparatus is extracted and stored in a first image buffer such that the image data stored in the first image buffer is used in an encoding process such as a residual data encoding process. On the other hand, image data on which deblocking filtering is performed by the decoding unit of the transcoding apparatus is stored in a second image buffer such that the image data stored in the second image buffer is used to generate prediction data by performing, for example, motion estimation.

In short, the image data on which deblocking filtering is performed by the decoding unit is used in a motion estimation process of the encoding unit in the second embodiment of the present invention while the image data on which deblocking filtering is not performed is used in the motion estimation process of the encoding unit in the first embodiment of the present invention. As such, according to the second embodiment of the present invention, prediction data generation processes are the same in the encoding and decoding units of the transcoding apparatus, and thus transcoding performance may be further improved. Also, in general, if motion estimation is performed by using an image to which a blocking effect occurs (an image on which deblocking filtering is not performed), accurate motion estimation may not be easily performed due to high-frequency components. Thus, according to the second embodiment of the present invention, the transcoding performance may be improved by using an image from which the blocking effect is removed by performing deblocking filtering, in the motion estimation process of the encoding unit.

Figure 6:
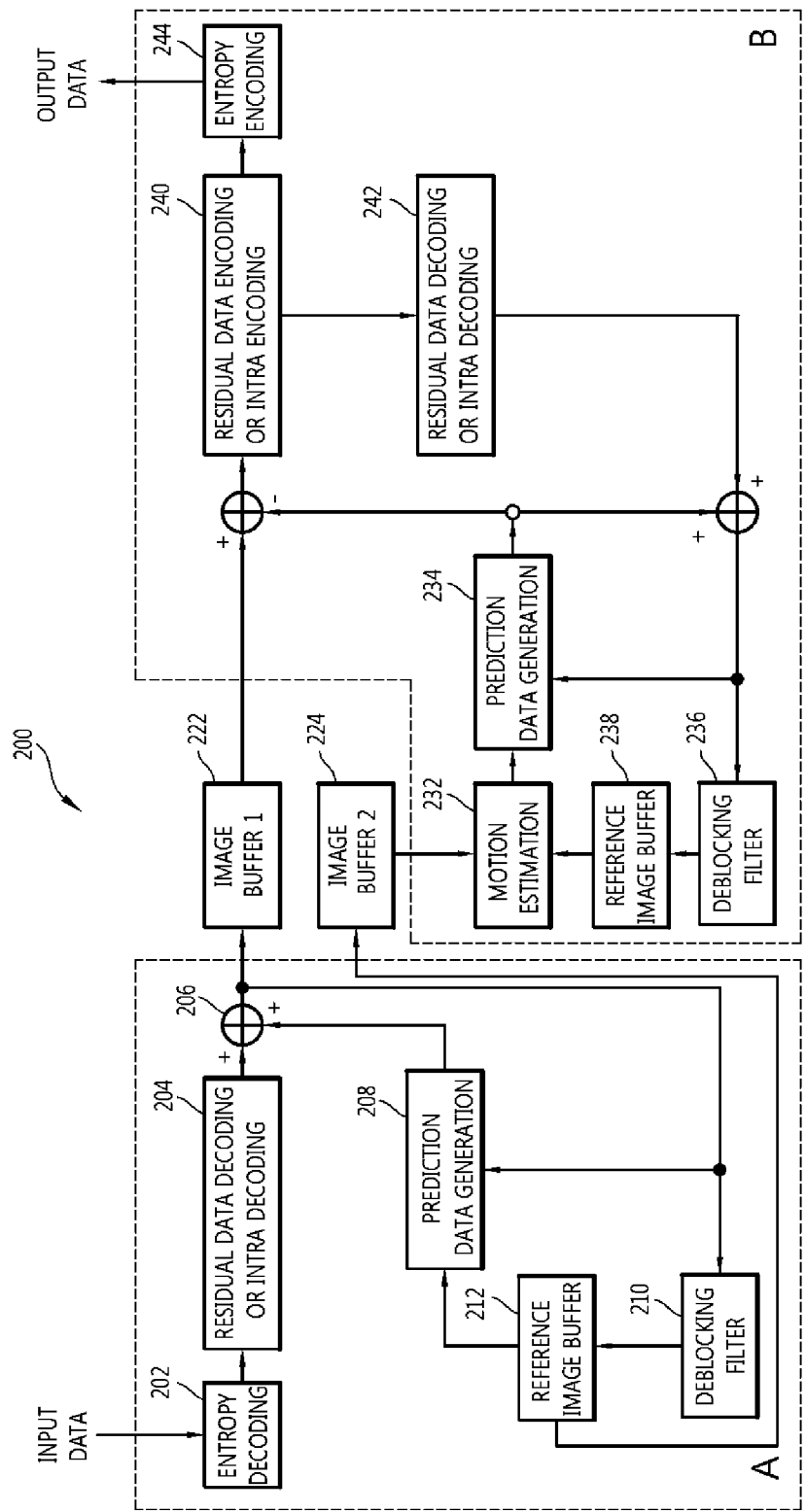
FIG. 6 is a diagram for describing a transcoding apparatus and method according to a second embodiment of the present invention.

FIG. 6 is a diagram for describing a transcoding apparatus and method between two codecs each including a deblocking filter, according to the second embodiment of the present invention. In FIG. 6, a decoding unit A and an encoding unit B respectively correspond to first and second video codecs for describing the transcoding apparatus and method according to the second embodiment of the present invention. Each of the decoding unit A and the encoding unit B includes a deblocking filter.

Referring to FIG. 6, input data encoded according to the first video codec is input to an entropy decoding portion 202 of the decoding unit A so as to perform entropy decoding according to the first video codec. Then, image data output from the entropy decoding portion 202 is input to a residual data decoding or intra decoding portion 204 so as to perform only residual data decoding, or to respectively perform residual data decoding and intra decoding on inter and intra blocks, according to the first video codec. A prediction data generation portion 208 generates prediction data of a current block. According to the first video codec, if the current block is an inter block, the prediction data may be generated by performing motion compensation using a reference image stored in a reference image buffer 212. If the current block is an intra block, the prediction data may be generated by performing intra prediction using an image in the same frame.

However, according to the type of the first video codec, the prediction data may not be generated if the current block is an intra block.

Then, the prediction data generated by the prediction data generation portion 208 and image data output from the residual data decoding or intra decoding portion 204 are input to an adder 206, and a decoded image is output from the adder 206. According to the second embodiment of the present invention, the decoded image output from the adder 206 is directly stored in a first image buffer 222 without passing through a deblocking filter 210. Then, the decoded image (inter image) output from the adder 206 is stored in the reference image buffer 212 so as to be used when a subsequent frame is decoded. In this case, as in a conventional transcoding method, image data passed through the deblocking filter 210 is stored. Here, the image data which is passed through the deblocking filter 210 and is stored in the reference image buffer 212, is also stored in a second image buffer 224 so as to be used as input data in a motion estimation process of the encoding unit B.

As such, according to the second embodiment of the present invention, decoded image data which is not passed through the deblocking filter 210 is stored in the first image buffer 222 and decoded image data which is passed through the deblocking filter 210 is stored in the second image buffer 224. Here, the first and second image buffers 222 and 224 are only logically separated, and the same memory may be physically used as the first and second image buffers 222 and 224. Image data stored in the first image buffer 222 is used as input data of the encoding unit B, however, image data stored in the second image buffer 224 is instead used as the input data only in the motion estimation process.

Continuously, the encoding unit B receives image data stored in the first and second image buffers 222 and 224 as the input data so as to perform an encoding process. In more detail, a motion estimation portion 232 may generate a motion vector by using a reference image stored in a reference image buffer 238 and an image input from the second image buffer 224, according to the second video codec. Then, according to the second video codec, if the current block is an inter block, a prediction data generation portion 234 generates prediction data from the reference image of the reference image buffer 238 by performing motion compensation using the motion vector generated by the motion estimation portion 232. If the current block is an intra block, the prediction data generation portion 234 may or may not generate the prediction data by performing intra prediction using an image in the same frame.

According to the second video codec, if the current block is an inter block, a residual data encoding or intra encoding portion 240 may encode residual data that is difference data between a prediction image generated through motion compensation performed by the prediction data generation portion 234 and a current image stored in the first image buffer 222. If the current block is an intra block, the residual data encoding or intra encoding portion 240 may encode residual data that is difference data between an intra prediction image generated by the prediction data generation portion 234 and the current image stored in the image buffer 222, or may perform intra encoding on the current image instead of the difference data between the intra prediction image and the current image. Also, an entropy encoding portion 244 performs entropy encoding according to the second video codec.

A residual data decoding or intra decoding portion 242 decodes image data encoded by the residual data encoding or intra encoding portion 240. Image data output from the residual data decoding or intra decoding portion 242 is added to the prediction image output from the prediction data generation portion 234 so as to be input to a deblocking filter 236. Image data on which deblocking filtering is performed by the deblocking filter 236 is stored in the reference image buffer 238 for next prediction.

Figure 7:
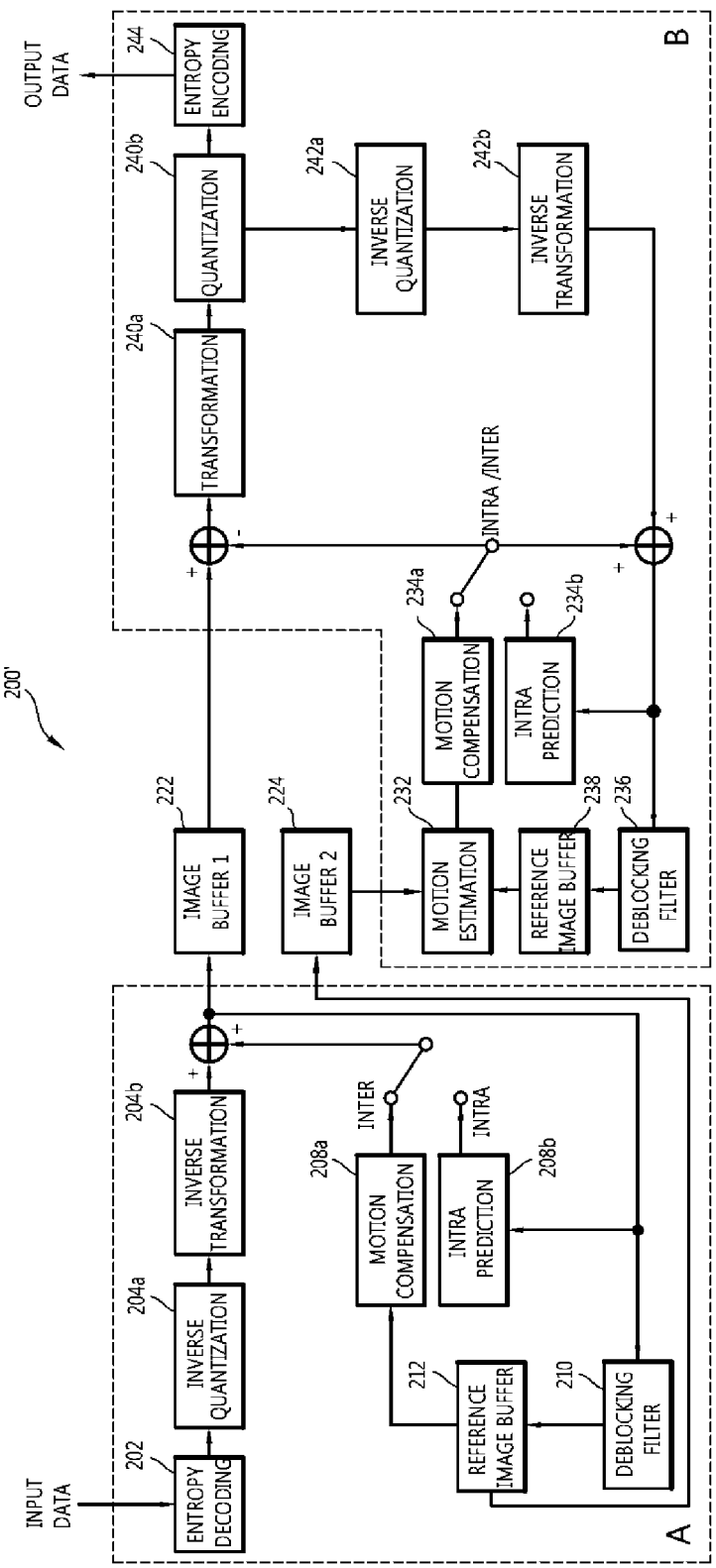
FIG. 7 is a diagram showing a case when transcoding is performed from a certain H.264/AVC-based codec to a different H.264/AVC-based codec, as a practical example of FIG. 6.

FIG. 7 is a diagram showing a case when a first video codec is a certain H.264/AVC-based codec and a second video codec is a different H.264/AVC-based codec, as a practical example of FIG. 6. For example, the first video codec (decoding unit A) may be a decoding unit according to a baseline profile of an H.264/AVC codec and the second video codec (encoding unit B) may be an encoding unit for supporting temporal scalability in a baseline profile of an SVC codec that is extended from the H.264/AVC codec. FIG. 7 will now be briefly described in conjunction with FIG. 6 based on differences from the descriptions of FIG. 6.

Referring to FIG. 7, according to video encoding/decoding processes of the H.264/AVC codec, the residual data decoding or intra decoding portion 204 and the residual data encoding or intra encoding portion 240 illustrated in FIG. 6 are respectively divided into an inverse quantization portion 204a and an inverse transformation portion 204b, and a transformation portion 240a and a quantization portion 240b. Also, the prediction data generation portion 208 illustrated in FIG. 6 is divided into a motion compensation portion 208a and an intra prediction portion 208b.

Referring to FIG. 7, according to the second embodiment of the present invention, image data output through the entropy decoding portion 202, the inverse quantization portion 204a, and the inverse transformation portion 204b is added to a prediction image output through the motion compensation portion 208a or the intra prediction portion 208b so as to be output as a decoded image. Then, the decoded image is directly stored in the first image buffer 222 without passing through the deblocking filter 210, so as to be used as first input data of the encoding unit B. Also, image data which pass through the deblocking filter 210 and are stored in the reference image buffer 212 are used as a reference image for the operation of the motion compensation portion 208a. The image data passed through the deblocking filter 210 is stored in the second image buffer 224 so as to be used as second input data of the encoding unit B.

As such, according to the second embodiment of the present invention, a decoded image on which deblocking filtering is performed is used as a reference image when a decoding unit of a transcoding apparatus performs motion estimation. On the other hand, a decoded image on which deblocking filtering is not performed is used as a reference image when residual data encoding or intra encoding is performed. Thus, according to the second embodiment of the present invention, in comparison to a case when an image on which deblocking filtering is not performed is used in a motion estimation process, accuracy of motion estimation may be improved and quality deterioration on a boundary area that is blurred by repeatedly performing deblocking filtering in a transcoding process, may be prevented.

Third Embodiment

In the third embodiment of the present invention, image data on which deblocking filtering is not performed by a decoding unit of a transcoding apparatus is extracted, is adaptively deblocking filtered along block boundaries, and is stored in an image buffer. An encoding unit of the transcoding apparatus receives the image data stored in the image buffer as input data so as to perform an encoding process. Here, an adaptive deblocking filtering process includes a process of performing deblocking filtering on only some block boundaries and/or a process of varying strength of deblocking filtering, according to the block boundaries. As such, the third embodiment of the present invention is different from the first embodiment of the present invention in which image data on which deblocking filtering is not performed at all is stored in an image buffer, and also is different from the second embodiment of the present invention in that a single type of image data is input to an encoding unit through a single image buffer.

Figure 8:
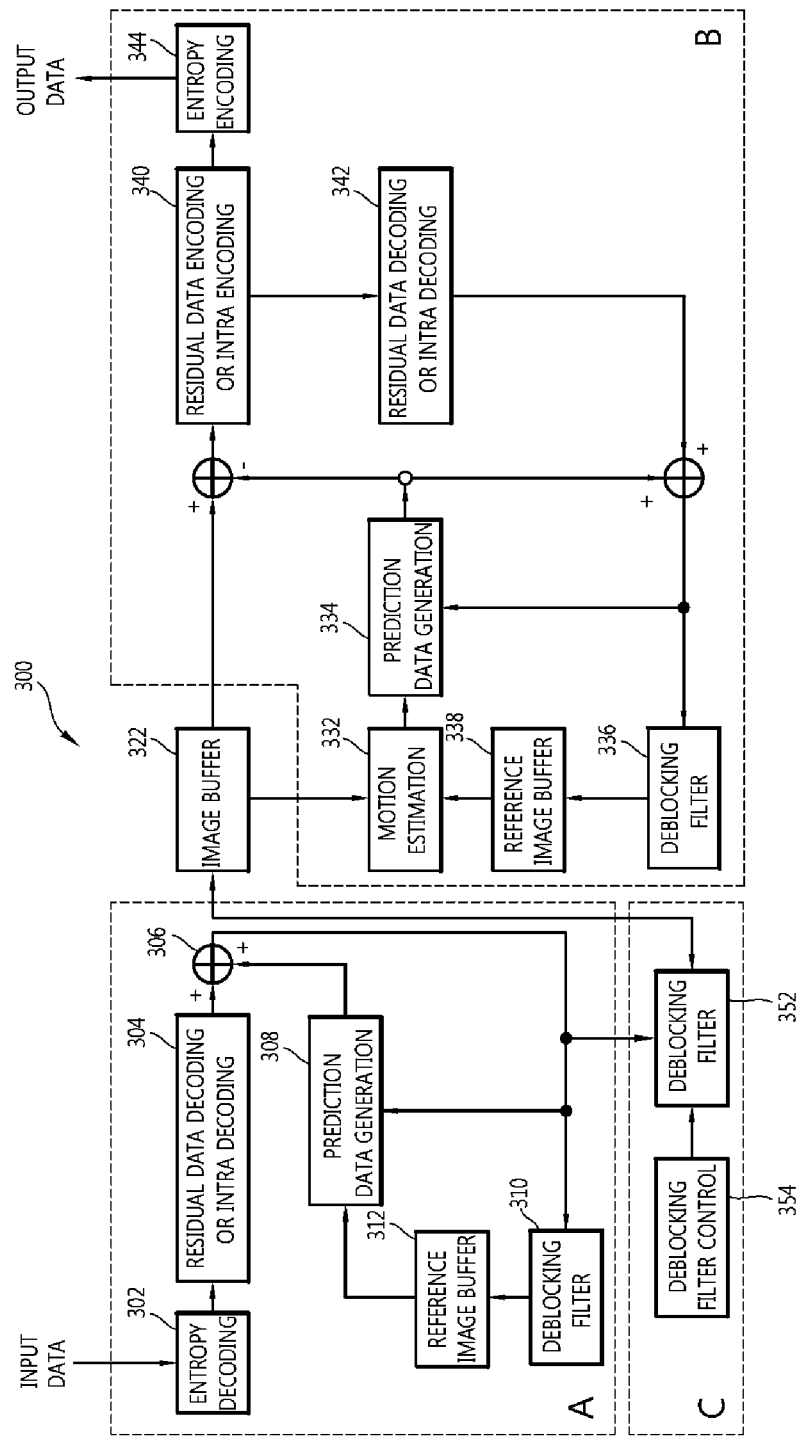
FIG. 8 is a diagram for describing a transcoding apparatus and method according to a third embodiment of the present invention.

FIG. 8 is a diagram for describing a transcoding apparatus and method between two codecs each including a deblocking filter, according to the third embodiment of the present invention. In the transcoding apparatus and method according to the third embodiment of the present invention, an adaptive deblocking filtering unit C is further included in addition to a decoding unit A (first video codec) and an encoding unit B (second video codec). In FIG. 8, each of the decoding unit A and the encoding unit B includes a deblocking filter, and the adaptive deblocking filtering unit C also includes a deblocking filter. The deblocking filters of the decoding unit A and the adaptive deblocking filtering unit C are only logically separated, and the same deblocking filter or different deblocking filters may be physically used as the deblocking filters of the decoding unit A and the adaptive deblocking filtering unit C.

Referring to FIG. 8, input data encoded according to the first video codec is input to an entropy decoding portion 302 of the decoding unit A so as to perform entropy decoding according to the first video codec. Then, image data output from the entropy decoding portion 302 is input to a residual data decoding or intra decoding portion 304 so as to perform only residual data decoding, or to respectively perform residual data decoding and intra decoding on inter and intra blocks, according to the first video codec. A prediction data generation portion 308 generates prediction data of a current block. According to the first video codec, if the current block is an inter block, the prediction data may be generated by performing motion compensation using a reference image stored in a reference image buffer 312. If the current block is an intra block, the prediction data may be generated by performing intra prediction using an image in the same frame. However, according to the type of the first video codec, the prediction data may not be generated if the current block is an intra block.

Then, the prediction data generated by the prediction data generation portion 308 and image data output from the residual data decoding or intra decoding portion 304 are input to an adder 306, and a decoded image is output from the adder 306. According to the third embodiment of the present invention, the decoded image output from the adder 306 is input to the adaptive deblocking filtering unit C. The adaptive deblocking filtering unit C performs adaptive deblocking filtering (which will be described in detail later) on input data and output data of the adaptive deblocking filtering unit C is temporarily stored in an image buffer 322. Then, the decoded image (inter image) output from the adder 306 is stored in the reference image buffer 312 so as to be used when a subsequent frame is decoded. In this case, as in a conventional transcoding method, image data passed through a deblocking filter 310 is stored.

As such, according to the third embodiment of the present invention, decoded image data output from the adder 306 passes through the adaptive deblocking filtering unit C before being stored in the image buffer 322. The adaptive deblocking filtering unit C controls operations of the deblocking filter 310 to adaptively perform or not to perform deblocking filtering according to situations, and may perform deblocking filtering even by using a different boundary strength from the deblocking filter 310 of the decoding unit A. In FIG. 8, a deblocking filter control portion 354 for controlling operations of a deblocking filter 352 is separately illustrated as an example. Logically or physically, the deblocking filter control portion 354 may be combined with or separated from the deblocking filter 352.

The adaptive deblocking filtering unit C may or may not perform deblocking filtering on certain block boundaries based on various principles. For example, if deblocking filtering is performed on some block boundaries only by the decoding unit A due to different transformation units in a transcoding process, the adaptive deblocking filtering unit C performs deblocking filtering on the block boundaries on which deblocking filtering is performed only by the decoding unit A.

As an example, it is assumed that transcoding is performed from a codec performing transformation in 4×4 blocks to a codec performing transformation in 8×8 blocks. In this case, the encoding unit B of the transcoding apparatus does not perform deblocking filtering on some boundaries of 4×4 blocks, which are not boundaries of 8×8 blocks. As such, in the encoding unit B, deblocking filtering is performed on common boundaries between 4×4 and 8×8 blocks while deblocking filtering is not performed on the boundaries of 4×4 blocks, which are not the boundaries of 8×8 blocks. Thus, in this case, the adaptive deblocking filtering unit C may perform deblocking filtering only on the boundaries of 4×4 blocks, which are not the boundaries of 8×8 blocks.

Figure 9:
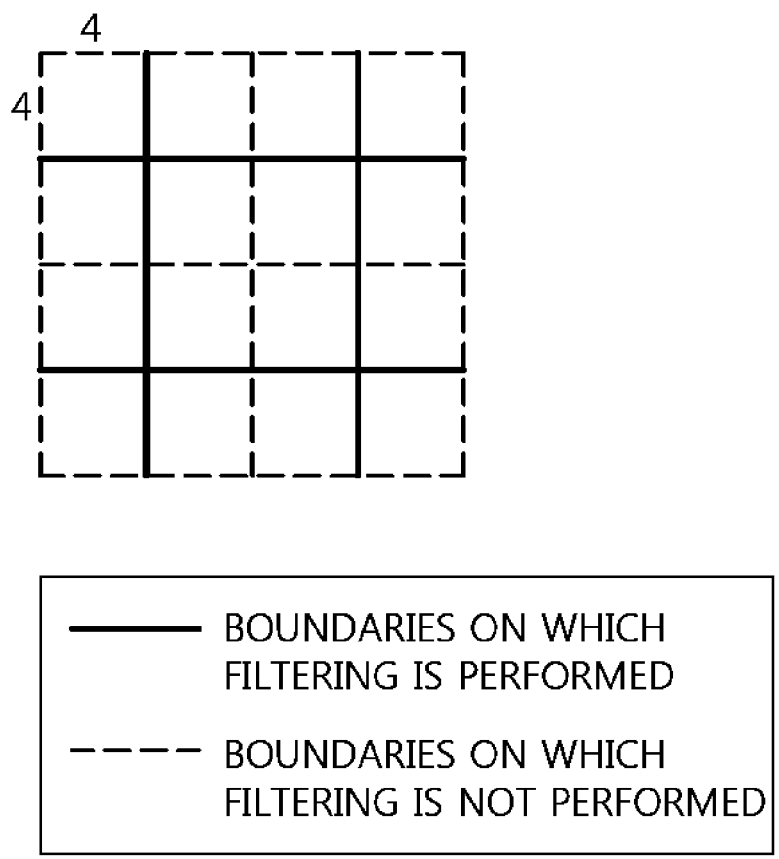
FIG. 9 is a diagram for describing an example of a method of controlling a deblocking filter.

FIG. 9 is a diagram of macroblocks showing some block boundaries on which deblocking filtering is performed by the adaptive deblocking filtering unit C illustrated in FIG. 8, in the above example.

Referring to FIG. 9, block boundaries indicated by a solid line correspond to boundaries of 4×4 blocks, and block boundaries indicated by a dotted line correspond to common boundaries between 4×4 and 8×8 blocks. The adaptive deblocking filtering unit C performs deblocking filtering on the block boundaries indicated by a solid line and does not perform deblocking filtering on the boundaries indicated by a dotted line.

The adaptive deblocking filtering unit C may perform deblocking filtering even by using a different boundary strength from the deblocking filter 310 of the deblocking unit A. For example, the adaptive deblocking filtering unit C may perform deblocking filtering by using a boundary strength that is reduced by N steps than the boundary strength of the deblocking filter 310 of the deblocking unit A. If N is two and the boundary strength of the deblocking filter 310 of the deblocking unit A is step 1 or step 2, the adaptive deblocking filtering unit C may not perform deblocking filtering.

Referring back to FIG. 8, image data output from the adaptive deblocking filtering unit C is temporarily stored in the image buffer 322. Then, the encoding unit B receives the image data stored in the image buffer 322 as the input data so as to perform an encoding process. In more detail, a motion estimation portion 332 may generate a motion vector by using a reference image stored in a reference image buffer 338 and an image input from the image buffer 322, according to the second video codec. Then, according to the second video codec, if the current block is an inter block, a prediction data generation portion 334 generates prediction data from the reference image of the reference image buffer 338 by performing motion compensation using the motion vector generated by the motion estimation portion 332. If the current block is an intra block, the prediction data generation portion 334 may or may not generate the prediction data by performing intra prediction using an image in the same frame.

According to the second video codec, if the current block is an inter block, a residual data encoding or intra encoding portion 340 may encode residual data that is difference data between a prediction image generated through motion compensation performed by the prediction data generation portion 334 and a current image stored in the image buffer 322. If the current block is an intra block, the residual data encoding or intra encoding portion 340 may encode residual data that is difference data between an intra prediction image generated by the prediction data generation portion 334 and the current image stored in the image buffer 322, or may perform intra encoding on the current image instead of the difference data between the intra prediction image and the current image. Also, an entropy encoding portion 344 performs entropy encoding according to the second video codec.

A residual data decoding or intra decoding portion 342 decodes image data encoded by the residual data encoding or intra encoding portion 340. Image data output from the residual data decoding or intra decoding portion 342 is added to the prediction image output from the prediction data generation portion 334 so as to be input to a deblocking filter 336. Image data on which deblocking filtering is performed by the deblocking filter 336 is stored in the reference image buffer 338 for next prediction.

As such, according to the third embodiment of the present invention, an adaptive deblocking filtering unit of a transcoding apparatus performs deblocking filtering on corresponding block boundaries by using a different boundary strength from a decoding unit in consideration of boundary characteristics. Thus, according to the second embodiment of the present invention, quality deterioration on a boundary area that is blurred by repeatedly performing deblocking filtering in a transcoding process, may be prevented. In addition, unlike the first embodiment of the present invention, since deblocking filtering is performed on only some block boundaries or is performed by reducing a boundary strength, in consideration of boundary characteristics, a problem in that motion estimation is not easily performed when deblocking filtering is not performed at all, may be prevented.

Fourth Embodiment

In the fourth embodiment of the present invention, two image buffers are used as in the second embodiment of the present invention. However, unlike the second embodiment of the present invention, in which an encoding unit of a transcoding apparatus uses image data on which deblocking filtering is not performed as input data in an encoding process and also uses image data on which deblocking filtering is performed as input data in a motion estimation process, according to the fourth embodiment of the present invention, image data on which adaptive deblocking filtering is performed is used as input data in an encoding process and image data on which deblocking filtering is performed is also used as input data in a motion estimation process. In more detail, image data on which adaptive deblocking filtering is performed by an adaptive deblocking filtering unit of the transcoding apparatus is stored in a first image buffer such that the image data stored in the first image buffer is used in an encoding process such as a residual data encoding process. On the other hand, image data on which deblocking filtering is performed by a deblocking filtering unit of the transcoding apparatus is stored in a second image buffer such that the image data stored in the second image buffer is used to generate prediction data by performing, for example, motion estimation.

In short, the image data on which adaptive deblocking filtering is performed by the adaptive deblocking filtering unit is used in, for example, the residual data encoding process of the encoding unit in the fourth embodiment of the present invention while the image data on which deblocking filtering is not performed by the decoding unit is used in, for example, the residual data encoding process of the encoding unit in the second embodiment of the present invention. As such, according to the fourth embodiment of the present invention, although a problem in that accurate motion estimation may not be easily performed due to high-frequency components may occur if motion estimation is performed by using an image to which a blocking effect occurs (an image on which deblocking filtering is not performed), transcoding efficiency may be improved by complementing the above problem. Also, since image data on which adaptive deblocking filtering is performed is used in, for example, the residual data encoding process, transcoding may be efficiently performed even when the decoding and encoding units use different transformation units.

Figure 10:
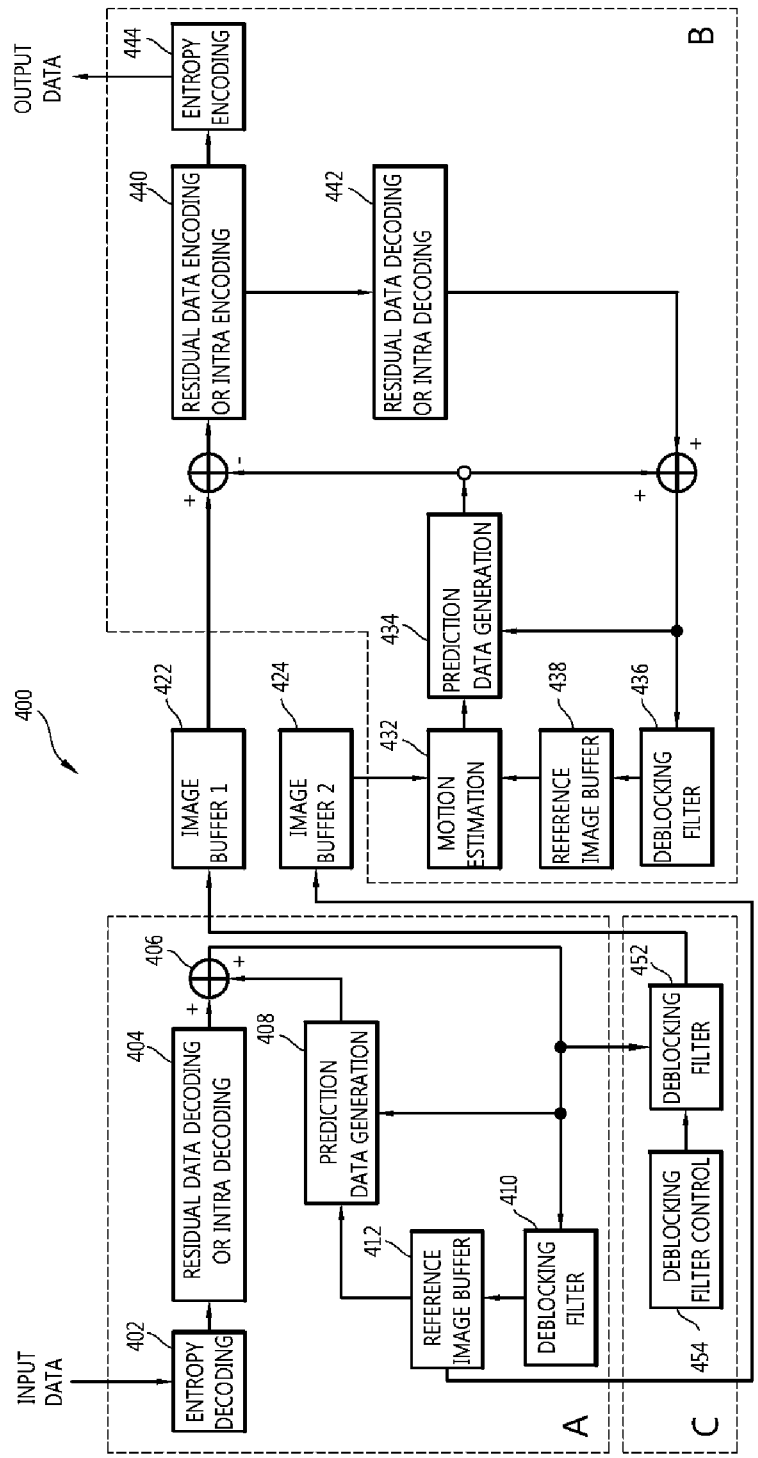
FIG. 10 is a diagram for describing a transcoding apparatus and method according to a fourth embodiment of the present invention.

FIG. 10 is a diagram for describing a transcoding apparatus and method between two codecs each including a deblocking filter, according to the fourth embodiment of the present invention. In the transcoding apparatus and method according to the fourth embodiment of the present invention, an adaptive deblocking filtering unit C is further included in addition to a decoding unit A (first video codec) and an encoding unit B (second video codec). In FIG. 10, each of the decoding unit A and the encoding unit B includes a deblocking filter, and the adaptive deblocking filtering unit C also includes a deblocking filter. The deblocking filters of the decoding unit A and the adaptive deblocking filtering unit C are only logically separated, and the same deblocking filter or different deblocking filters may be physically used as the deblocking filters of the decoding unit A and the adaptive deblocking filtering unit C.

Referring to FIG. 10, input data encoded according to the first video codec is input to an entropy decoding portion 402 of the decoding unit A so as to perform entropy decoding according to the first video codec. Then, image data output from the entropy decoding portion 402 is input to a residual data decoding or intra decoding portion 404 so as to perform only residual data decoding, or to respectively perform residual data decoding and intra decoding on inter and intra blocks, according to the first video codec. A prediction data generation portion 408 generates prediction data of a current block. According to the first video codec, if the current block is an inter block, the prediction data may be generated by performing motion compensation using a reference image stored in a reference image buffer 412. If the current block is an intra block, the prediction data may be generated by performing intra prediction using an image in the same frame. However, according to the type of the first video codec, the prediction data may not be generated if the current block is an intra block.

Then, the prediction data generated by the prediction data generation portion 408 and image data output from the residual data decoding or intra decoding portion 404 are input to an adder 406, and a decoded image is output from the adder 406. According to the fourth embodiment of the present invention, as in the third embodiment of the present invention, the decoded image output from the adder 406 is input to the adaptive deblocking filtering unit C. The adaptive deblocking filtering unit C performs adaptive deblocking filtering (which is described in detail in the third embodiment and thus detailed description thereof will be omitted here) on input data and output data of the adaptive deblocking filtering unit C is temporarily stored in a first image buffer 422. Then, the decoded image (inter image) output from the adder 406 is stored in the reference image buffer 412 so as to be used when a subsequent frame is decoded. In this case, as in a conventional transcoding method, image data passed through a deblocking filter 410 is stored. Here, the image data which is passed through the deblocking filter 410 and is stored in the reference image buffer 412, is also stored in a second image buffer 424 so as to be used as input data in a motion estimation process of the encoding unit B.

As such, according to the fourth embodiment of the present invention, decoded image data passed through the adaptive deblocking filtering unit C instead of the deblocking filter 410 is stored in the first image buffer 422. Then, decoded image data passed through the deblocking filter 410 is stored in the second image buffer 424. Here, the first and second image buffers 422 and 424 are only logically separated, and the same memory may be physically used as the first and second image buffers 422 and 424. Image data stored in the first image buffer 422 is used as input data of the encoding unit B, however, image data stored in the second image buffer 424 is instead used as the input data only in the motion estimation process.

Continuously, the encoding unit B receives image data stored in the first and second image buffers 422 and 424 as the input data so as to perform an encoding process. In more detail, a motion estimation portion 432 may generate a motion vector by using a reference image stored in a reference image buffer 438 and an image input from the second image buffer 424, according to the second video codec. Then, according to the second video codec, if the current block is an inter block, a prediction data generation portion 434 generates prediction data from the reference image of the reference image buffer 438 by performing motion compensation using the motion vector generated by the motion estimation portion 432. If the current block is an intra block, the prediction data generation portion 434 may or may not generate the prediction data by performing intra prediction using an image in the same frame.

According to the second video codec, if the current block is an inter block, a residual data encoding or intra encoding portion 440 may encode residual data that is difference data between a prediction image generated through motion compensation performed by the prediction data generation portion 434 and a current image stored in the first image buffer 422. If the current block is an intra block, the residual data encoding or intra encoding portion 440 may encode residual data that is difference data between an intra prediction image generated by the prediction data generation portion 434 and the current image stored in the first image buffer 422, or may perform intra encoding on the current image instead of the difference data between the intra prediction image and the current image.

Intra prediction encoding may be performed by using a neighboring block of the current block. Then, an entropy encoding portion 444 performs entropy encoding according to the second video codec. Also, a residual data decoding or intra decoding portion 442 decodes image data encoded by the residual data encoding or intra encoding portion 440. Image data output from the residual data decoding or intra decoding portion 442 is added to the prediction image output from the prediction data generation portion 434 so as to be input to a deblocking filter 436. Image data on which deblocking filtering is performed by the deblocking filter 436 is stored in the reference image buffer 438 for next prediction.

As such, according to the fourth embodiment of the present invention, a decoded image on which deblocking filtering is performed is used as a reference image when an decoding unit of a transcoding apparatus performs motion estimation. On the other hand, a decoded image on which adaptive deblocking filtering is performed is used as a reference image when residual data encoding or intra encoding is performed. Thus, according to the fourth embodiment of the present invention, in comparison to a case when an image on which deblocking filtering is not performed is used in a motion estimation process, accuracy of motion estimation may be improved. In addition, since image data on which adaptive deblocking filtering is performed is used as input data of the encoding unit, deblocking filtering may be performed on only some block boundaries or is performed by controlling a boundary strength, according to types of the block boundaries. As a result, quality deterioration on a boundary area that is blurred by performing deblocking filtering by using the same boundary strength, or by repeatedly performing deblocking filtering in a transcoding process, may be prevented.

Hereinabove, the first through fourth embodiments of the present invention have been described in detail. The transcoding methods according to the first through fourth embodiments of the present invention are independent from each other. However, the transcoding methods may be implemented in apparatuses having different configurations or having the same configuration. Since the different configurations are illustrated in FIGS. 3 through 10, the same configuration will now be described in detail with reference to FIG. 11.

Figure 11:
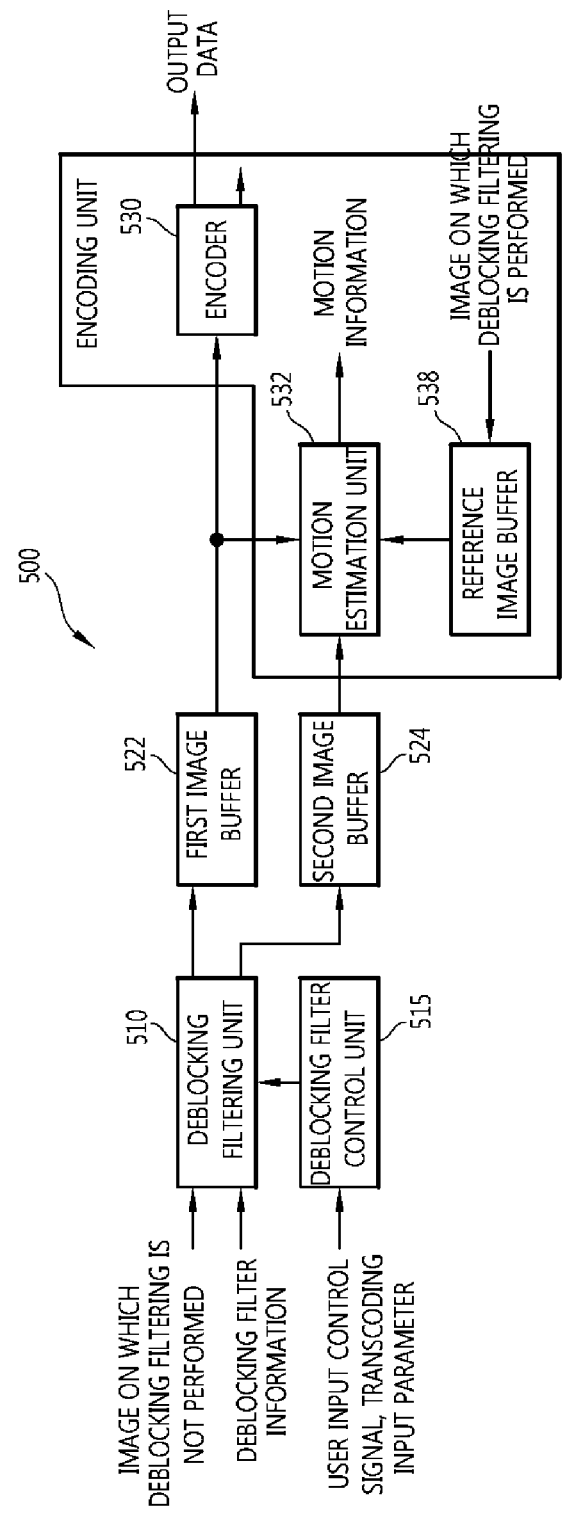
FIG. 11 is a block diagram of a transcoding apparatus for performing the transcoding methods according to the first through fourth embodiments of the present invention, according to an embodiment of the present invention.

FIG. 11 is a block diagram of a transcoding apparatus 500 for performing the transcoding methods according to the first through fourth embodiments of the present invention, according to an embodiment of the present invention. In FIG. 11, minimum elements showing technical features of the transcoding apparatus 500 according to the current embodiment of the present invention are illustrated and general elements to be included in decoding and encoding units are omitted. FIG. 11 shows a case when the deblocking filter 310 of the decoding unit A and the deblocking filter 352 of the adaptive deblocking filtering unit C which are illustrated in FIG. 8 according to the third embodiment of the present invention, or the deblocking filter 410 of the decoding unit A and the deblocking filter 452 of the adaptive deblocking filtering unit C which are illustrated in FIG. 10 according to the fourth embodiment of the present invention are combined into a single deblocking filter. However, it is obvious to one skilled in the art that the current embodiment of the present invention may also be applied when the deblocking filters are separated.

Referring to FIG. 11, the transcoding apparatus 500 according to the current embodiment of the present invention includes a deblocking filter 510, a deblocking filter control unit 515, first and second image buffer 522 and 524, a motion estimation unit 532, a reference image buffer 538, and an encoder 530.

The deblocking filter 510 corresponds to a decoding unit of the transcoding apparatus 500 and performs deblocking filtering on input data according to a corresponding codec. The deblocking filter 510 may perform an original deblocking filtering process and/or may not perform a deblocking filtering process or may perform an adaptive deblocking filtering process as described above, according to a control signal of the deblocking filter control unit 515. In order to perform such deblocking filtering processes, the deblocking filter 510 may receive image data on which deblocking filtering is not performed, deblocking filter information input to perform deblocking filtering in a conventional method, and the control signal from the deblocking filter control unit 515.

The deblocking filter control unit 515 controls operations of the deblocking filter 510. For example, in order to implement a transcoding method according to an embodiment of the present invention, the deblocking filter control unit 515 may control a parameter used when the deblocking filter 510 performs deblocking filtering. An input of the deblocking filter control unit 515 may be a control signal input by a user or a parameter input when transcoding is performed.

The first image buffer 522 is a memory that stores an input image of an encoding unit performing an encoding process in the transcoding apparatus 500. According to the current embodiment of the present invention, the first image buffer 522 may store the image data on which deblocking filtering is not performed by the decoding unit, or image data on which adaptive deblocking filtering is performed according to the third or fourth embodiment of the present invention. The image data stored in the first image buffer 522 is basically used as input data of the encoder 530 of the encoding unit of the transcoding apparatus 500 (refer to the first through fourth embodiments), or may be used as input data of the motion estimation unit 532 of the encoding unit of the transcoding apparatus 500 (refer to the first through third embodiments).

The second image buffer 524 is a temporary element and receives and stores image data on which deblocking filtering is performed by using a conventional method by the decoding unit of the transcoding apparatus 500. For example, in the second and fourth embodiments of the present invention, the image data stored in the second image buffer 524, instead of the image data stored in the first image buffer 522, is input to the motion estimation unit 532 of the encoding unit of the transcoding apparatus 500.

As such, the motion estimation unit 532 performs motion estimation by using the image data input from the second image buffer 524 so as to obtain motion information such as a motion vector. The motion estimation unit 532 operates in the encoding unit of the transcoding apparatus 500, and performs motion estimation by using the image data input from the first image buffer 522 or the second image buffer 524 and a reference image stored in the reference image buffer 538 so as to obtain the motion information.

The reference image buffer 538 receives and stores image data on which deblocking filtering is performed by a deblocking filter (not shown) of the encoder 530 of the transcoding apparatus 500. The image data stored in the reference image buffer 538 is used when the motion estimation unit 532 performs motion estimation.

Lastly, the encoder 530 of the transcoding apparatus 500 generates and outputs encoded image data as a transcoding result of the transcoding apparatus 500. As described above, the image data stored in the first image buffer 522 is basically provided to the encoder 530 as input data and the image data stored in the second image buffer 524 is provided to the motion estimation unit 532 as input data for a motion estimation process.

According to the above embodiment of the present invention, when transcoding is performed between codecs each including a deblocking filter, quality deterioration such as blurring, which is caused by repeatedly performing deblocking filtering in decoding and encoding processes for transcoding, may be prevented. Also, a decoding unit of a transcoding apparatus according to the present invention may efficiently generate image data on which deblocking filtering is not performed, image data on which adaptive deblocking filtering is performed, and/or image data on which deblocking filtering is performed. Furthermore, an encoding unit of a transcoding apparatus according to the present invention may use only image data on which deblocking filtering is not performed or image data on which adaptive deblocking filtering is performed, or use together with image data on which deblocking filtering is performed, thereby improving transcoding performance.

While the present invention has been particularly shown and described with reference to exemplary embodiments thereof, it will be understood by one skilled in the art that various changes in form and details may be made therein without departing from the spirit and scope of the present invention as defined by the following claims.

What is claimed is:

1. A transcoding method between first and second codecs each comprising a deblocking filter, the transcoding method comprising:
    decoding input data encoded according to the first codec, according to the first codec so as to generate decoded data; and
    encoding the decoded data according to the second codec, wherein the decoded data comprises
        first data on which deblocking filtering is not performed by the first codec, the first data stored in a first image buffer before being processed by the second codec, and
        second data, to be used for prediction, on which deblocking filtering is performed by the first codec, the second data stored in a second image buffer before being processed by the second codec.

2. The transcoding method of claim 1, wherein the first data is used as input data when the second codec performs encoding and when the second codec performs motion estimation.

3. The transcoding method of claim 1, wherein the first data is used as input data when the second codec performs encoding, and
    wherein the second data is used as input data when the second codec performs motion estimation.

4. The transcoding method of claim 1, wherein each of the first and second codecs is one of a baseline profile of an H.264/Advanced Video Coding (AVC) codec, a main profile of the H.264/AVC codec, an extended profile of the H.264/AVC codec, a scalable video coding (SVC) codec, a multiview video coding (MVC) codec, a VC-1 codec of the Society of Motion Picture and Television Engineers (SMPTE), and an Audio Video Standard (AVC) codec.

5. A transcoding method between first and second codecs each comprising a deblocking filter, the transcoding method comprising:
    decoding input data encoded according to the first codec, according to the first codec so as to generate decoded data; and
    encoding the decoded data according to the second codec, wherein the decoded data comprises
        first data on which deblocking filtering is adaptively performed by the first codec, the first data stored in a first image buffer before being processed by the second codec, and
        second data, to be used for prediction, on which deblocking filtering is not performed by the first codec, the second data stored in a second image buffer before being processed by the second codec.

6. The transcoding method of claim 5, wherein the first data is used as input data when the second codec performs encoding and when the second codec performs motion estimation.

7. The transcoding method of claim 6, wherein the first data is generated by performing deblocking filtering according to the first codec on only some block boundaries based on types of the block boundaries, or by performing deblocking filtering according to the first codec by using a different boundary strength from the first codec.

8. The transcoding method of claim 7, wherein the types of the block boundaries are determined by using a first block unit which is a transformation unit of the first codec, and a second block unit which is a transformation unit of the second codec, and wherein the first data is data in which deblocking filtering is performed on an area corresponding to block boundaries in the first block unit and not corresponding to block boundaries in the second block unit, and is not performed on an area corresponding to block boundaries in both the first block unit and the second block unit.

9. The transcoding method of claim 8, wherein the first data is used as input data when the second codec performs encoding, and wherein the second data is used as input data when the second codec performs motion estimation.

10. A transcoding apparatus between first and second codecs each comprising a deblocking filter, the transcoding apparatus comprising:

a decoding unit for decoding input data encoded according to the first codec and outputting decoded data;

a first image buffer for storing the first decoded data as a first data before filtering by a deblocking filter of the decoding unit;

a second image buffer for storing the decoded data as a second data after filtering by the deblocking filter of the decoding unit; and an encoding unit for encoding the first data input from the first image buffer, according to the second codec.

11. The transcoding apparatus of claim 10, wherein the first data is used as input data when the encoding unit performs encoding and when the encoding unit performs motion estimation.

12. The transcoding apparatus of claim 10, wherein the encoding unit encodes the first data according to the second codec together with the second data input from the second image buffer.

13. The transcoding apparatus of claim 12, wherein the first data is used as input data when the encoding unit performs encoding, and wherein the second data is used as input data when the encoding unit performs motion estimation.

14. A transcoding apparatus between first and second codecs each comprising a deblocking filter, the transcoding apparatus comprising:

a decoding unit for decoding input data encoded according to the first codec, according to the first codec;

an adaptive deblocking filter for performing adaptive deblocking filtering on decoded data;

a first image buffer for storing the decoded data as a first data when the decoded data are filtered by the adaptive deblocking filter;

a second image buffer for storing the decoded data as a second data when the decoded data are not filtered by the adaptive deblocking filter; and an encoding unit for encoding the first data input from the first image buffer, according to the second codec.

15. The transcoding apparatus of claim 14, wherein the first data is used as input data when the encoding unit performs encoding and when the encoding unit performs motion estimation.

16. The transcoding apparatus of claim 15, wherein the adaptive deblocking filter performs deblocking filtering according to the first codec on only some block boundaries based on types of the block boundaries, or performs deblocking filtering according to the first codec by using a different boundary strength from the first codec.

17. The transcoding apparatus of claim 14, wherein the adaptive deblocking filter comprises:

a second deblocking filter for performing deblocking filtering according to the first codec; and a deblocking filter control unit for controlling operations of the second deblocking filter.

18. The transcoding apparatus of claim 14, wherein the encoding unit encodes the first data according to the second codec together with the second data input from the second image buffer.

* * * * *